US009602919B2

United States Patent
Caballero et al.

(10) Patent No.: US 9,602,919 B2
(45) Date of Patent: Mar. 21, 2017

(54) ELECTRONIC DEVICE WITH WIRELESS POWER CONTROL SYSTEM

(71) Applicant: Apple Inc., Cupertino, CA (US)

(72) Inventors: Ruben Caballero, San Jose, CA (US); Michael DiVincent, Discovery Bay, CA (US); Indranil S. Sen, Santa Clara, CA (US); Robert W. Schlub, Cupertino, CA (US); Mohit Narang, Cupertino, CA (US); Ricardo R. Velasco, San Jose, CA (US); Christopher B. Crowe, Santa Clara, CA (US); Scott Vernon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 867 days.

(21) Appl. No.: 13/886,157

(22) Filed: May 2, 2013

(65) Prior Publication Data

US 2014/0328488 A1   Nov. 6, 2014

(51) Int. Cl.
*H04R 29/00* (2006.01)
*H04R 1/02* (2006.01)
(Continued)

(52) U.S. Cl.
CPC ............ *H04R 3/00* (2013.01); *H04B 1/3838* (2013.01); *H04W 52/0209* (2013.01);
(Continued)

(58) Field of Classification Search
CPC ... H04R 3/00; H04W 52/0209; H04B 1/0343; H04B 1/3838; H04M 2250/12; H01Q 1/245; Y02B 60/50
(Continued)

(56) References Cited

U.S. PATENT DOCUMENTS

| 5,168,173 | A | * | 12/1992 | Windsor | ................... | F16P 3/20 |
| | | | | | | 192/129 A |
| 7,039,435 | B2 | | 5/2006 | McDowell et al. | | |

(Continued)

FOREIGN PATENT DOCUMENTS

| CN | 101374368 | 2/2009 |
| CN | 102265242 | 1/2011 |

(Continued)

OTHER PUBLICATIONS

Schlub et al., U.S. Appl. No. 13/865,578, filed Apr. 18, 2013.
Caballero et al., U.S. Appl. No. 13/886,157, filed May 2, 2013.
Yarga et al., U.S. Appl. No. 13/855,568, filed Apr. 2, 2013.

*Primary Examiner* — Vivian Chin
*Assistant Examiner* — Douglas Suthers
(74) *Attorney, Agent, or Firm* — Treyz Law Group, P.C.; G. Victor Treyz; Michael H. Lyons

(57) ABSTRACT

An electronic device may include wireless circuitry that is configured to transmit wireless signals during operation. A maximum transmit power level may be established that serves as a cap on how much power is transmitted from the electronic device. Adjustments may be made to the maximum transmit power level in real time based on sensor signals and other information on the operating state of the electronic device. The sensor signals may include motion signals from an accelerometer. The sensor signals may also include ultrasonic sound detected by a microphone. Device orientation data may be used by the device to select whether to measure the ultrasonic sound using a front facing or rear facing microphone. Maximum transmit power level may also be adjusted based on whether or not sound is playing through an ear speaker in the device.

19 Claims, 9 Drawing Sheets

(51) Int. Cl.
  *H04R 9/06* (2006.01)
  *H04R 3/00* (2006.01)
  *H04B 1/3827* (2015.01)
  *H04W 52/02* (2009.01)
  *H04B 1/034* (2006.01)

(52) U.S. Cl.
  CPC ....... *H04B 1/0343* (2013.01); *H04M 2250/12* (2013.01); *Y02B 60/50* (2013.01)

(58) Field of Classification Search
  USPC .................................................. 381/58, 334
  See application file for complete search history.

(56) References Cited

U.S. PATENT DOCUMENTS

| | | | |
|---|---|---|---|
| 8,159,399 B2 | 4/2012 | Dorsey et al. | |
| 8,189,429 B2 | 5/2012 | Chen et al. | |
| 8,392,340 B2 | 3/2013 | Cox et al. | |
| 8,417,296 B2 | 4/2013 | Caballero et al. | |
| 8,432,322 B2 | 4/2013 | Amm et al. | |
| 2009/0054111 A1* | 2/2009 | Takizawa | H04M 1/0214 455/575.1 |
| 2009/0190769 A1 | 7/2009 | Wang et al. | |
| 2009/0305742 A1* | 12/2009 | Caballero | H04B 1/3838 455/566 |
| 2011/0003615 A1 | 1/2011 | Langereis | |
| 2011/0012794 A1 | 1/2011 | Schlub et al. | |
| 2011/0159920 A1* | 6/2011 | Lehmann | H04M 1/0202 455/556.1 |
| 2011/0250928 A1 | 10/2011 | Schlub et al. | |
| 2011/0304512 A1 | 12/2011 | Friederich et al. | |
| 2012/0214412 A1 | 8/2012 | Schlub et al. | |
| 2013/0158711 A1 | 6/2013 | Smith et al. | |

FOREIGN PATENT DOCUMENTS

| | | |
|---|---|---|
| EP | 1103086 A1 | 5/2001 |
| TW | 201246895 A1 | 11/2012 |
| TW | I377850 | 11/2012 |
| WO | 0008709 A1 | 2/2000 |
| WO | 2009149023 | 10/2009 |
| WO | 2012143936 | 10/2012 |

* cited by examiner

ELECTRONIC DEVICE WITH WIRELESS POWER CONTROL SYSTEM

BACKGROUND

This relates generally to electronic devices, and more particularly, to electronic devices with wireless communications circuitry.

Electronic devices such as portable computers and handheld electronic devices are often provided with wireless communications capabilities. For example, electronic devices may have wireless communications circuitry to communicate using cellular telephone bands and to support communications with satellite navigation systems and wireless local area networks.

To satisfy consumer demand for small form factor wireless devices, manufacturers are continually striving to reduce the size of components that are used in these devices while providing enhanced functionality. It is generally impractical to completely shield a user of a compact handheld device from transmitted radio-frequency signals. For example, conventional cellular telephone handsets generally emit signals in the vicinity of a user's head during telephone calls. Government regulations limit radio-frequency signal powers. In particular, so-called specific absorption rate (SAR) standards are in place that impose maximum energy absorption limits on handset manufacturers. At the same time, wireless carriers require that the handsets that are used in their networks be capable of producing certain minimum radio-frequency powers so as to ensure satisfactory operation of the handsets.

The manufacturers of electronic devices such as portable wireless devices therefore face challenges in producing devices with adequate radio-frequency signal strengths that are compliant with applicable government regulations.

It would be desirable to be able to address these challenges by providing improved wireless communications circuitry for wireless electronic devices.

SUMMARY

An electronic device may include wireless circuitry that is configured to transmit wireless signals during operation. A maximum transmit power level may be established that serves as a cap on how much power is transmitted from the electronic device. Adjustments may be made to the maximum transmit power level in real time based on sensor signals and other information on the operating state of the electronic device. When it is determined that the electronic device is being operated while resting on an inanimate object such as a table, the maximum transmit power level may be set to a maximum value. When it is determined that the electronic device is resting on the body of a user, the maximum transmit power may be set to a reduced level. When it is determined that the electronic device is being held near the ear of a user so that the device is offset from the user's body, the maximum transmit power level may be set to a level between the reduced level and the maximum value.

The sensor signals that are gathered by the electronic device to ascertain how the electronic device is being used may include motion signals from an accelerometer. The sensor signals may also include ultrasonic sound detected by a microphone. Device orientation data may be used by the device to select whether to measure the ultrasonic sound using a front facing or rear facing microphone. The maximum transmit power level may also be adjusted based on whether or not sound is playing through an ear speaker in the device.

Further features of the invention, its nature and various advantages will be more apparent from the accompanying drawings and the following detailed description of the preferred embodiments.

DETAILED DESCRIPTION

Figure 1A:
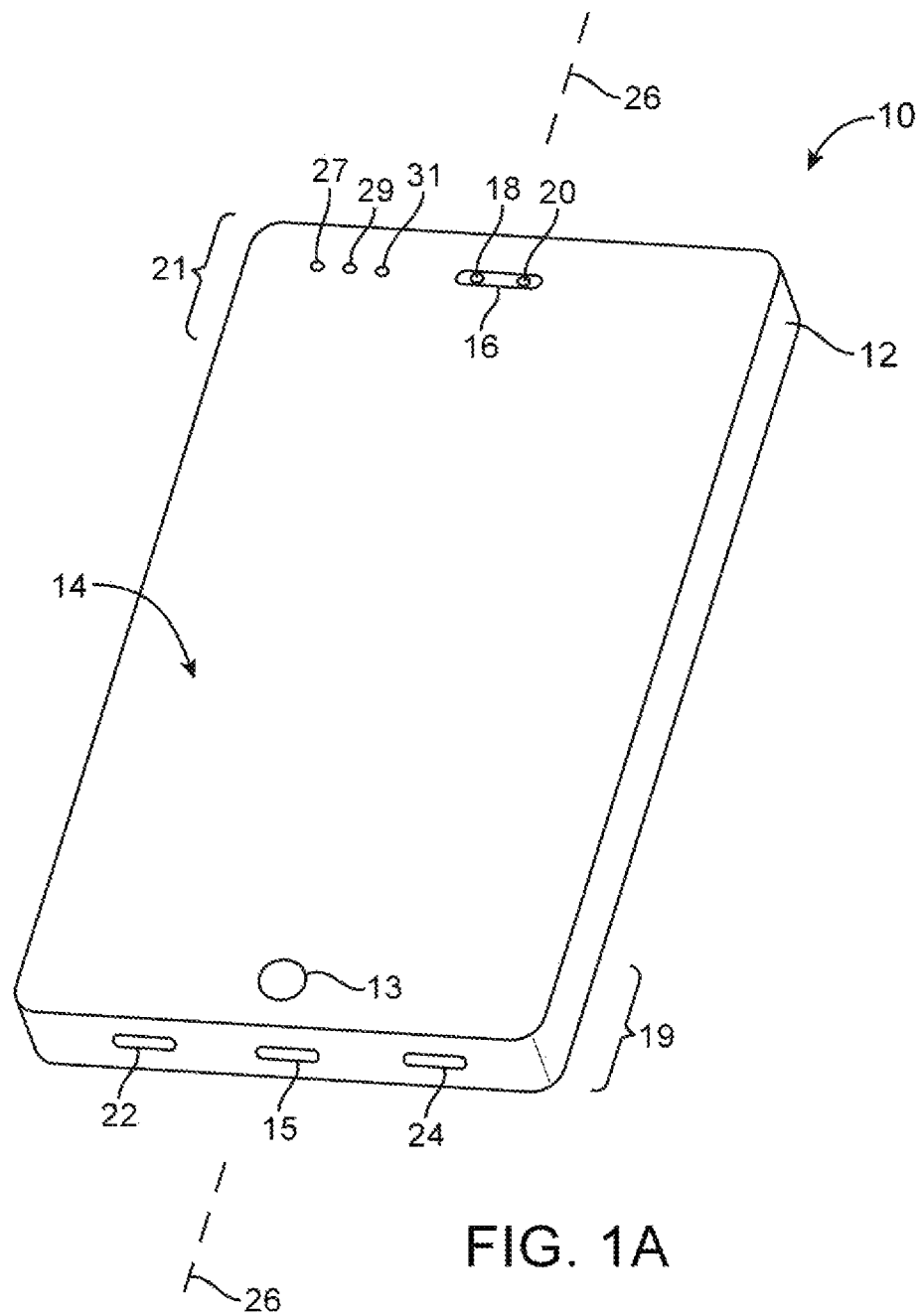
FIG. 1A is a front perspective view of an illustrative electronic device with wireless communications circuitry in accordance with an embodiment of the present invention.
Figure 1B:
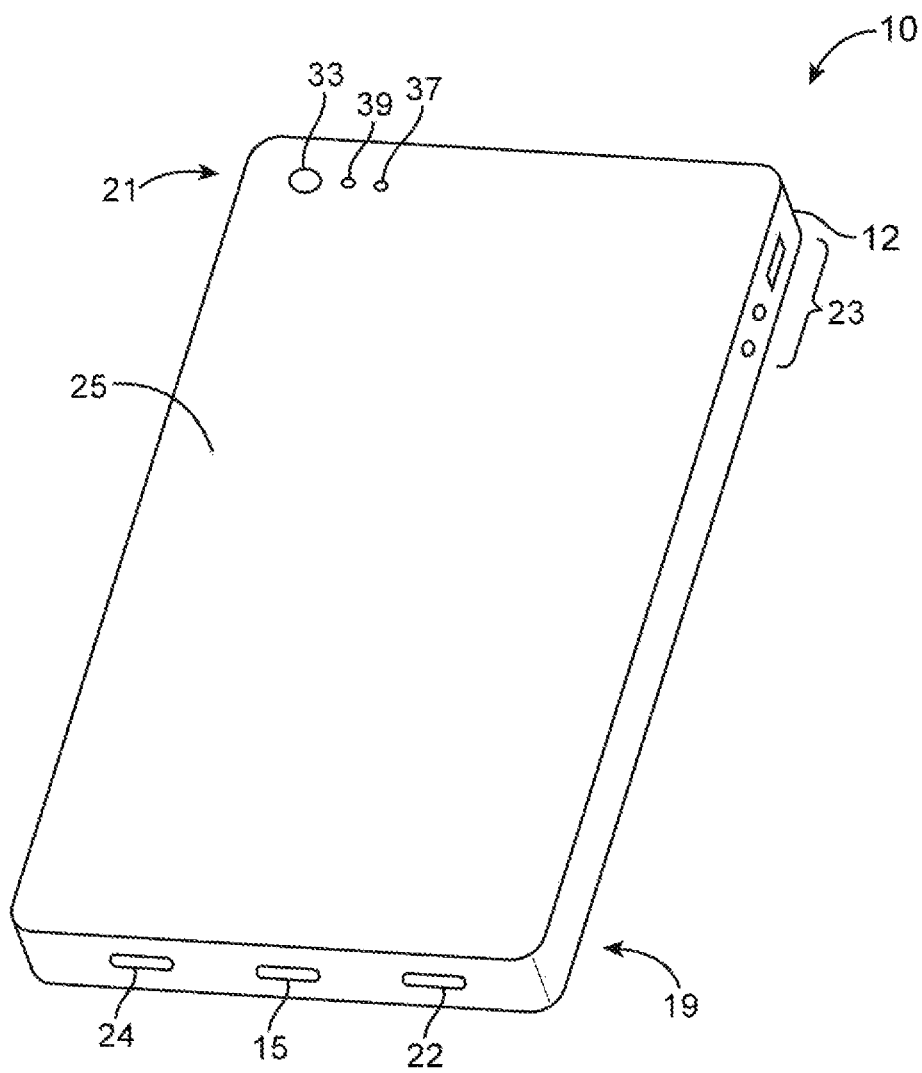
FIG. 1B is a rear perspective view of an illustrative electronic device with wireless communications circuitry in accordance with an embodiment of the present invention.

Electronic devices such as electronic device 10 of FIGS. 1A and 1B may be provided with wireless communications circuitry. Information from sensor circuitry and other information may be used in controlling the operation of the wireless communications circuitry. For example, the maximum power level of transmitted wireless signals may be controlled in real time to ensure that regulatory limits are satisfied or are exceeded.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, or a media player. Device 10 may also be a television, a set-top box, a desktop computer, a computer monitor into which a computer has been integrated, a wireless router, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electrowetting pixels, electrophoretic pixels, liquid crystal display (LCD) components, or other suitable image pixel structures. A display cover layer such as a layer of clear glass or plastic may cover the surface of display 14. Buttons such as button 13 may pass through openings in the cover layer.

The cover layer for display 14 may also have other openings such as an opening for speaker port 16. Speaker port 16 may include a speaker such as speaker 18 and microphone 20. Microphone 20 may be used to detect sound in the vicinity of speaker 18. Microphone 20 may, for example, be used to detect ambient noise so that an ambient noise reduction feature can be implemented for speaker 18.

Device 10 may have an elongated shape with a main longitudinal axis such as axis 26. Speaker port 16, which may sometimes be referred to as an ear speaker port or receiver port, may be located at upper end 21 of device 10 on the front face of device 10 (i.e., on the same side of device 10 that includes display 14).

Openings such as openings 22, 15, and 24 may be located at opposing lower end 19 of device 10. Openings such as opening 15 in device housing 12 may be associated with data ports. Openings such as openings 22 and 24 may be associated respectively with microphone and speaker ports.

Components such as front-facing camera 27, ambient light sensor 29, and infrared-light-based proximity sensor 31 may be formed in upper region 21 of device 10 or elsewhere on the front face of device 10 (as an example).

A rear perspective view of device 10 of FIG. 1A is shown in FIG. 1B. As shown in FIG. 1B, device 10 having surface 25 may include buttons such as buttons 23. Buttons 23 may include volume buttons (e.g., volume up and volume down buttons) and buttons for placing device 10 in a ringer mode or silent mode (as examples). Device 10 may also include a rear facing camera such as camera 33, a camera flash such as flash 37, and a rear-facing microphone such as microphone 35. Microphone 35 may be used to gather data from a subject when a video clip of the subject is being recorded using camera 33.

During operation of device 10, a user of device 10 may hold device 10 against the user's head. For example, ear speaker 18 may be placed at the user's ear while microphone port 22 is placed in the vicinity of the user's mouth. This position for device 10 allows the user to have a telephone conversation.

Device 10 may also be operated wirelessly when not being held against the user's head. For example, device 10 may be used to browse the internet, to handle email and text messages, and to support other wireless communications operations. When not held against the user's head, device 10 may be used in a speakerphone mode in which microphone 22 is used to gather voice information from a user while speaker 24 is used to play back telephone call audio to the user. Speaker 24 may also be used to play back wirelessly streaming audio such as music to a user when device 10 is not being held against the user's head.

To ensure that regulatory limits on transmitted power are satisfied, it may be desirable to limit the maximum wireless transmit power level for device 10 whenever it can be determined that device 10 is in the vicinity of a user's body. For example, it may be desirable to limit the maximum wireless transmit power level for device 10 whenever it is determined that device 10 is being held against the user's head or when device 10 is being rested against another body part such as the user's leg.

Device 10 can make real time adjustments to the amount of wireless transmit power that is being used based on feedback from the wireless equipment with which device 10 is communicating and/or based on locally measured data. At the same time, the maximum wireless transmit power level can serve as a cap to ensure that the transmitted power does not exceed an acceptable level for the device's current environment, even if a higher transmit power is being requested by external equipment. By adjusting the maximum permitted transmit power dynamically, device 10 can be operated optimally in a variety of situations.

The user may sometimes rest device 10 on an external surface such as a table top or other inanimate object. In this type of situation, it may not be desirable to limit maximum wireless transmit power (i.e., it may be desirable to set the maximum transmit power level to a maximum value). Device 10 in this situation will not be adjacent to a user's body, so excessive limitations on wireless transmit power may be avoided to avoid needlessly degrading wireless performance.

To ensure that regulatory limits for emitted radiation are satisfied or exceeded, device 10 can monitor its operating state and can gather and analyze information from sensors. Different transmitted power limits may be imposed on transmitted wireless signals depending on the mode of operation of device 10.

Figure 2:
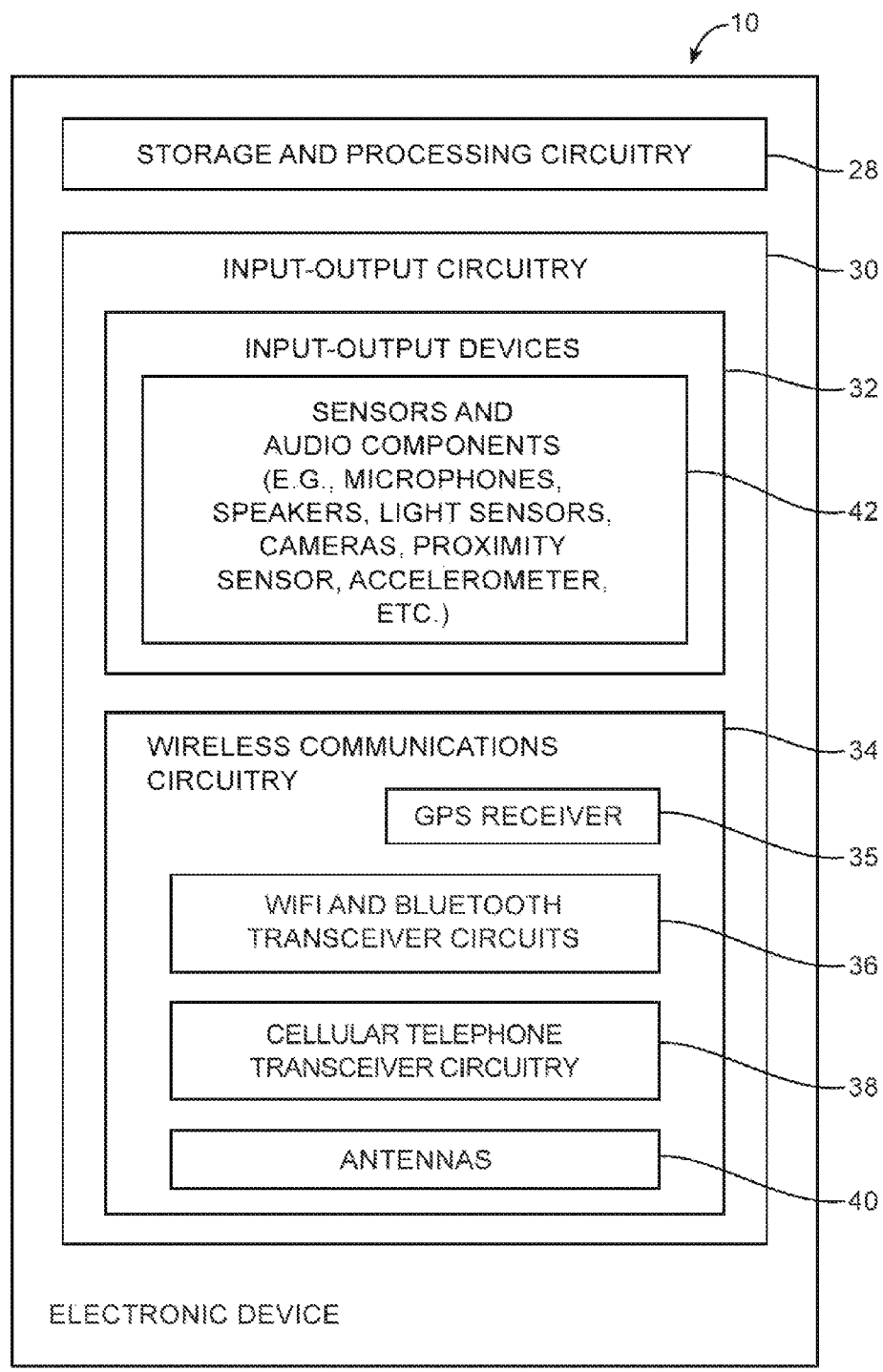
FIG. 2 is a schematic diagram of an illustrative electronic device with wireless communications circuitry in accordance with an embodiment of the present invention.

A schematic diagram of an illustrative configuration that may be used for electronic device 10 is shown in FIG. 2. As shown in FIG. 2, electronic device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. The processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, etc.

Circuitry 28 may be configured to implement control algorithms that control the use of antennas and other wireless circuitry in device 10. For example, circuitry 28 may perform signal quality monitoring operations, sensor monitoring operations, and other data gathering operations and may, in response to the gathered data and information on which communications bands are to be used in device 10, control which antenna structures within device 10 are being used to receive and process data and/or may adjust one or more switches, tunable elements, or other adjustable circuits in device 10 to adjust antenna performance. As an example, circuitry 28 may control which of two or more antennas is being used to receive incoming radio-frequency signals, may control which of two or more antennas is being used to transmit radio-frequency signals, may control the process of routing incoming data streams over two or more antennas in device 10 in parallel, may tune an antenna to cover a desired communications band, etc.

Circuitry 28 may also control wireless transmit powers and maximum transmit power level settings based on sensor data and other information on the operating state of device 10. For example, circuitry 28 may limit the maximum amount of power that may be transmitted by device 10 depending on which mode device is operating in. When device 10 is being operated near a user's body, maximum transmit power can be reduced. When device 10 is being operated away from the user's body, maximum transmit power can be increased.

In performing these control operations, circuitry 28 may open and close switches, may turn on and off receivers and transmitters, may adjust impedance matching circuits, may configure switches in front-end-module (FEM) radio-frequency circuits that are interposed between radio-frequency transceiver circuitry and antenna structures (e.g., filtering and switching circuits used for impedance matching and signal routing), may adjust switches, tunable circuits, and other adjustable circuit elements that are formed as part of an antenna or that are coupled to an antenna or a signal path associated with an antenna, may adjust power amplifier gain settings, may control transceiver output powers, and may otherwise control and adjust the components of device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, light-emitting diodes and other status indicators, data ports, etc. Input-output devices 32 may also include sensors and audio components 42. For example, input-output devices 32 may include an ambient light sensor such as ambient light sensor 29 of FIG. 1A for monitoring the amount of light in the environment surrounding device 10. Input-output devices 32 may include a light-based proximity sensor such as a proximity sensor having an infrared light emitter and a corresponding infrared light detector for detecting reflected infrared light from external objects in the vicinity of device 10 or may include a capacitive proximity sensor or other proximity sensor structure (proximity sensor structure 31 of FIG. 1A). Input-output devices 32 may also include a gyroscope, an accelerometer, cameras such as front-facing camera 27 and rear-facing camera 33, a temperature sensor, etc. Components 42 may include audio components such as speakers, tone generators, and vibrators (e.g., speakers such as speakerphone speaker 24 of FIG. 1A and ear speaker 18) or other audio output devices that produce sound. The audio components may also include microphones such as voice microphone 22 on the front face or lower end side wall of housing 12, front-facing ambient noise reduction microphone 20 in ear speaker port 16, and rear-facing microphone 35.

During operation, a user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, filters, duplexers, and other circuitry for handling RF wireless signals. Wireless signals can also be sent using light (e.g., using infrared communications).

Wireless communications circuitry 34 may include satellite navigation system receiver circuitry such as Global Positioning System (GPS) receiver circuitry 39 (e.g., for receiving satellite positioning signals at 1575 MHz) or satellite navigation system receiver circuitry associated with other satellite navigation systems. Wireless local area network transceiver circuitry such as transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands in frequency ranges of about 700 MHz to about 2700 MHz or bands at higher or lower frequencies. Wireless communications circuitry 34 can include circuitry for other short-range and long-range wireless links if desired. For example, wireless communications circuitry 34 may include wireless circuitry for receiving radio and television signals, paging circuits, etc. Near field communications may also be supported (e.g., at 13.56 MHz). In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may have antenna structures such as one or more antennas 40. Antenna structures 40 may be formed using any suitable antenna types. For example, antenna structures 40 may include antennas with resonating elements that are formed from loop antenna structures, patch antenna structures, inverted-F antenna structures, dual arm inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link. Antenna structures in device 10 such as one or more of antennas 40 may be provided with one or more antenna feeds, fixed and/or adjustable components, and optional parasitic antenna resonating elements so that the antenna structures cover desired communications bands.

Figure 3:
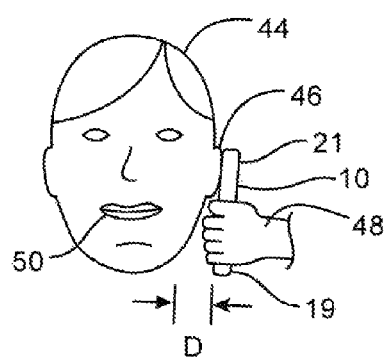
FIG. 3 is a diagram of an illustrative electronic device being used at the ear of a user in accordance with an embodiment of the present invention.

Device 10 may be operated in a variety of positions relative to a user's body. As shown in FIG. 3, for example, when a user is making a telephone call, device 10 may be held adjacent to a head of a user (e.g., head 44). In this configuration, upper end 21 of device 10 is adjacent to ear 46 of the user, so that the user may listen to audio that is being played through speaker 18. Lower end 19 is aligned with the user's mouth 50. This allows the user's voice to be detected by microphone 22.

Antennas 40 may include antennas in lower region 19 and/or in upper region 21. As an example, device 10 may include an upper antenna in upper region 21 and a lower antenna in lower region 19. The lower antenna in region 19 may be used as the primary transmitting antenna during voice telephone calls. The upper antenna in region 21 may be used as a secondary antenna. The antenna in lower region 19 may be spaced by a non-zero distance D (e.g., 5-30 mm) from head 44. This is generally greater than the separation between the antenna in upper region 21 and the user's head, so it may be desirable to use antenna 19 as the primary transmitting antenna in device 10 to reduce wireless signal power at the user's head.

Figure 4:
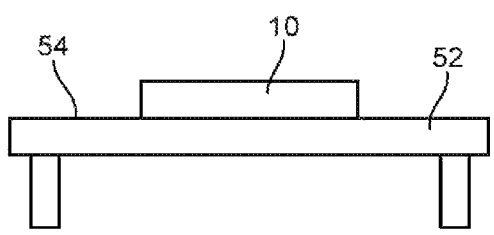
FIG. 4 is a diagram of an illustrative electronic device being used while resting on an inanimate object such as a table in accordance with an embodiment of the present invention.

The operating mode shown in FIG. 3 may sometimes be referred to as "at head" operating mode, because device 10 is being operated at head 44 of the user (i.e., adjacent to ear 46). Another illustrative operating mode for device 10 is shown in FIG. 4. In the scenario of FIG. 4, device 10 is resting on an inanimate support structure such as a table or other piece of furniture. Device 10 may, for example, be resting on upper surface 54 of table 52. Table 52 and other inanimate support structures for device 10 may be formed from a material such a wood (e.g., a hard and rigid material).

Figure 5:
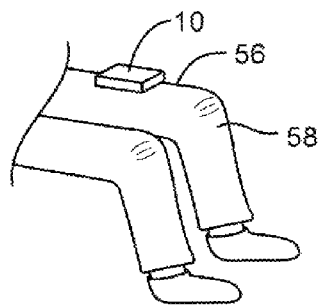
FIG. 5 is a diagram of an illustrative electronic device being used while resting on a user body part such as the leg of a user in accordance with an embodiment of the present invention.

When device 10 is being operated in speaker mode or when device 10 is being used for other functions that do not involve holding device 10 against the user's ear, device 10 may rest on a user's lap. As shown in FIG. 5, for example, device 10 may rest on surface 56 of leg 58. Due to the soft and porous nature of clothing worn by the user and due to the presence of soft flesh in the user's leg, surfaces such as body surface 56 are typically softer and more likely to absorb high frequency sounds than the surface of a table such as table 52 of FIG. 4. This behavior of the user's clothing and body may be exploited when using sensors to detect the operating environment of device 10.

The different operating modes of device 10 that are illustrated in FIGS. 3, 4, and 5 may be used to determine correspondingly different maximum wireless transmit power levels to use for device 10.

For example, when a user is using device 10 in an environment such as the table-top environment of FIG. 4, it may be desirable to operate device 10 at its maximum rated power (i.e., the maximum transmit power for device 10 may be set to an "unrestricted" level—i.e., a maximum value—that is selected based on regulatory limits for free space operation and carrier requirements, but that is not further limited by concerns about emissions into a nearby body part.

In an operating environment of the type shown in FIG. 3, device 10 (i.e., the lower antenna in region 19) is close to the user's body (i.e., head 44), but is typically separated by a distance D. In this scenario, it may be desirable to operate device 10 at a maximum transmit power level that is reduced by a first amount (e.g., 1-3 dB or other suitable amount) from the maximum (unrestricted) value of the maximum transmit power level.

In an operating environment of the type shown in FIG. 5, device 10 (e.g., the lower antenna in region 19) is generally closer to the user's body (e.g., leg 58) than in the operating environment of FIG. 3. Accordingly, it may be desirable to operate device 10 at a maximum transmit power level that is reduced by a second amount from the maximum (unrestricted) value of the maximum transmit power level (e.g., a maximum transmit power level that is reduced by 2-13 dB from the unrestricted maximum transmit level or by 1-10 dB from the maximum transmit level used in the "at head" operating mode).

Figure 6:
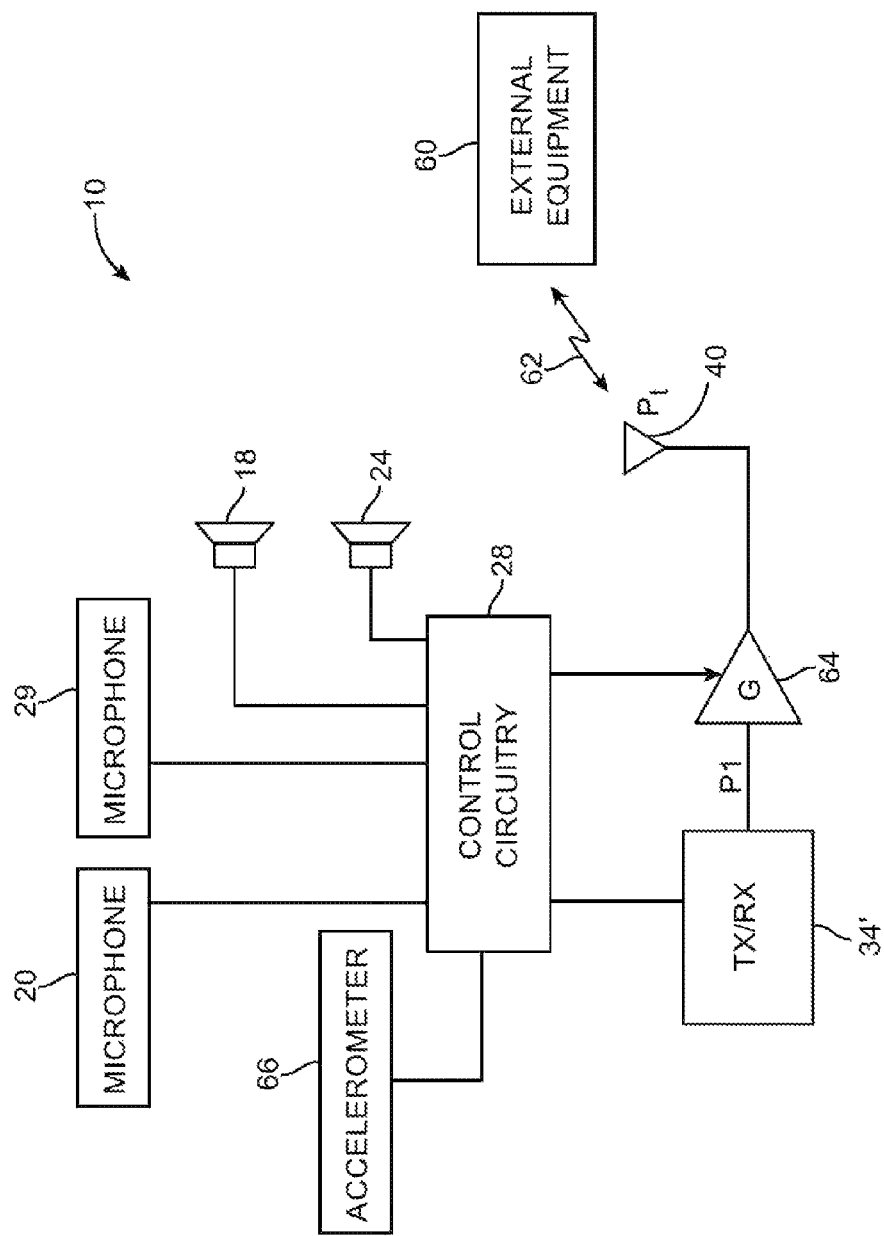
FIG. 6 is a schematic diagram of an illustrative electronic device configured to make dynamic adjustments to a maximum wireless transmit power level in accordance with an embodiment of the present invention.

Device 10 can use sensor data and other information on the current operating state of device 10 to ascertain which maximum transmit power level to use. FIG. 6 is a schematic diagram of illustrative components in device 10 that may be used in monitoring the operating environment of device 10 and in enforcing corresponding maximum transmit levels for transmitted wireless signals. As shown in FIG. 6, device 10 may use transceiver circuitry 34' and power amplifier 64 to generate wireless radio-frequency signals 62 that are wirelessly transmitted to wireless external equipment 60. External equipment 60 may be wireless local area network equipment (e.g., equipment such as a wireless local area network base station), a cellular telephone base station, or other wireless base station. External equipment 60 may, if desired, include peer devices, network equipment, computers, handheld devices, etc.

Control circuitry 28 can control the amount of power Pt that is being transmitted wirelessly from antenna 40 by controlling the power P1 of transceiver circuitry 34' and by controlling the gain G of power amplifier 64. Control circuitry 28 can determine in real time whether or not the output power Pt has reached a maximum transmit power limit. At output powers below the maximum transmit power, control circuitry 28 can increase and decrease the output power in real time based on received transmit power commands from external equipment 60, based on received signal strength indicator information, based on sensor data, or based on other information. Whenever control circuitry 28 reaches a maximum transmit power limit Pmax, further increases in output power Pt will be capped (i.e., Pt is limited to Pmax and will not exceed Pmax). Because the amount of signal power that is transmitted is limited to the value of Pmax and cannot exceed Pmax, Pmax is sometimes referred to as the upper limit on transmitted power or the maximum transmitted power limit (maximum transmit power limit) for device 10.

Control circuitry 28 can adjust the maximum transmit power Pmax in real time based on information on the operating state of device 10 and based on data from one or more sensors in input-output devices 32. In the illustrative configuration of FIG. 6, device 10 has microphones such as front-facing microphone 20 and rear-facing microphone 35. Device 10 also has accelerometer 66. Front-facing microphone 20 can detect sound at the front face of device 10. Rear facing microphone 35 can detect sound at the rear face of device 10. Accelerometer 66 may be used to measure motion of device 10 (e.g., movement of the type that results when a user holds device 10 on the user's lap or rests device 10 on other body parts) and may be used to determine the direction of the pull of the Earth's gravity and thereby determine the orientation of device 10 relative to the Earth.

Whenever it is determined that ear speaker 18 is being used to play sound to the user, control circuitry 28 can determine that device 10 is likely being used in the "at ear" mode shown in FIG. 3 (i.e., the user is making a voice telephone call).

Figure 7:
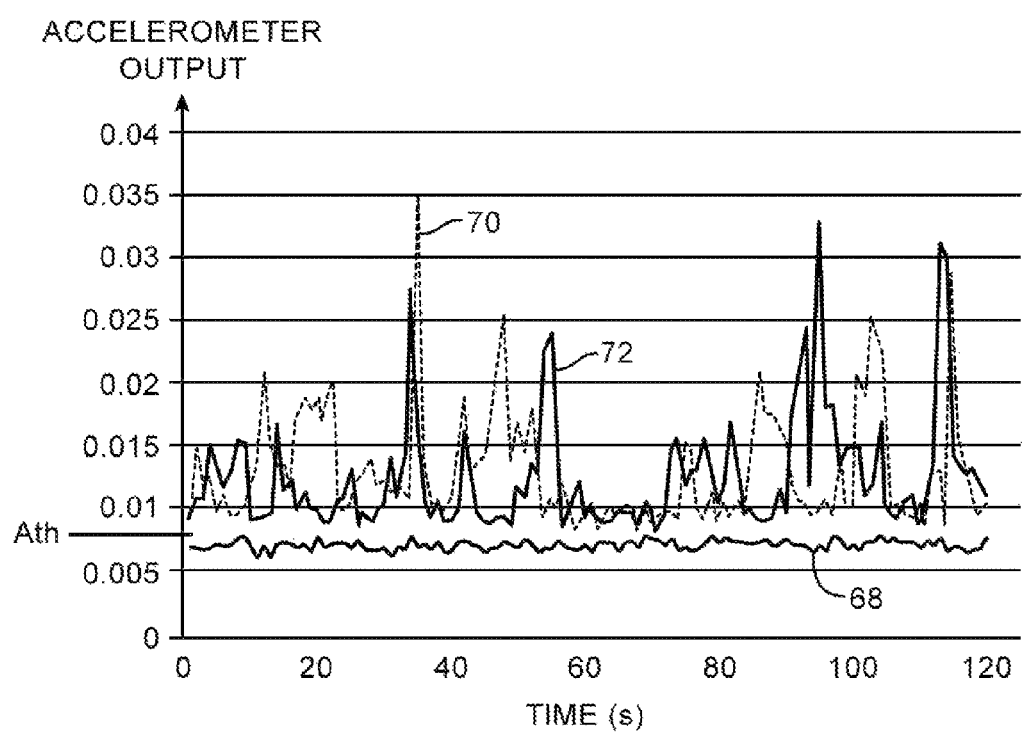
FIG. 7 is a graph showing how use of an electronic device that is being held by a user or that is resting on the body of a user can be detected using an accelerometer that monitors device motion in accordance with an embodiment of the present invention.

Signals from accelerometer 66 may be used to determine whether device 10 is resting on a user's body. FIG. 7 is a graph in which accelerometer data from accelerometer 66 has been plotted as a function of time. Accelerometer 66 may be, for example a three axis accelerometer that produces X, Y, and Z axis data. The accelerometer output signal in the graph of FIG. 7 may correspond to a summation of the X, Y, and Z channels of the accelerometer, may correspond to a summation of the standard deviations of one second polling of the X, Y, and Z channel data, may be time averaged or otherwise time delayed (e.g., to implement a state persistence scheme in which abrupt state changes are filtered out—for example, after detecting when a device is placed on a table allowing the device to remain in the "on table" state until a large motion is detected) or may correspond to other functions of data from the X, Y, and/or Z channels. Line 68 corresponds to an accelerometer signal from device 10 in a configuration in which device 10 is resting on a table or other solid inanimate object such as table 52 of FIG. 4. Lines 70 and 72 correspond to accelerometer signals from device 10 in a configuration in which device 10 is resting on the body of a user (see, e.g., leg 58 of FIG. 5). Lines 70 and 72 may be associated with different orientations of device 10 (e.g., portrait orientation versus landscape orientation, etc.).

To help device 10 discriminate between usage scenarios in which device 10 is resting on a part of a user's body and in which device 10 is resting on a structure such as a table, control circuitry 28 may compare the accelerometer output data from accelerometer 66 to a threshold value such as movement level threshold Ath of FIG. 7. In response to determining that the accelerometer data is less than movement threshold Ath, control circuitry 28 can conclude that device 10 is resting on table 52. In response to determining that the accelerometer data is more than threshold Ath, control circuitry 28 can conclude that device 10 is not resting on table 52 and is therefore potentially resting on the body of a user. Larger accelerometer values (i.e., values larger than the values associated with lines 70 and 72) may be measured during active use of device 10 (e.g., when a user is walking, etc.). In these situations, control circuitry 28 can also conclude that device 10 is not resting on a table.

Device 10 may use acoustic information to further analyze how device 10 is being used by a user. For example, device 10 may emit audio signals (sound) using a speaker such as speaker 24 or other audio transducer (e.g., a vibrator, tone generator, speaker, or other audio signal source). Device 10 may then detect the emitted audio signals using one or more microphones in device 10 such as front-facing microphone 20 or rear-facing microphone 35. The amount of audio that is detected in this type of scenario can reveal whether device 10 is resting on a table or other inanimate object or is possibly resting on a leg or other body part.

Figure 8:
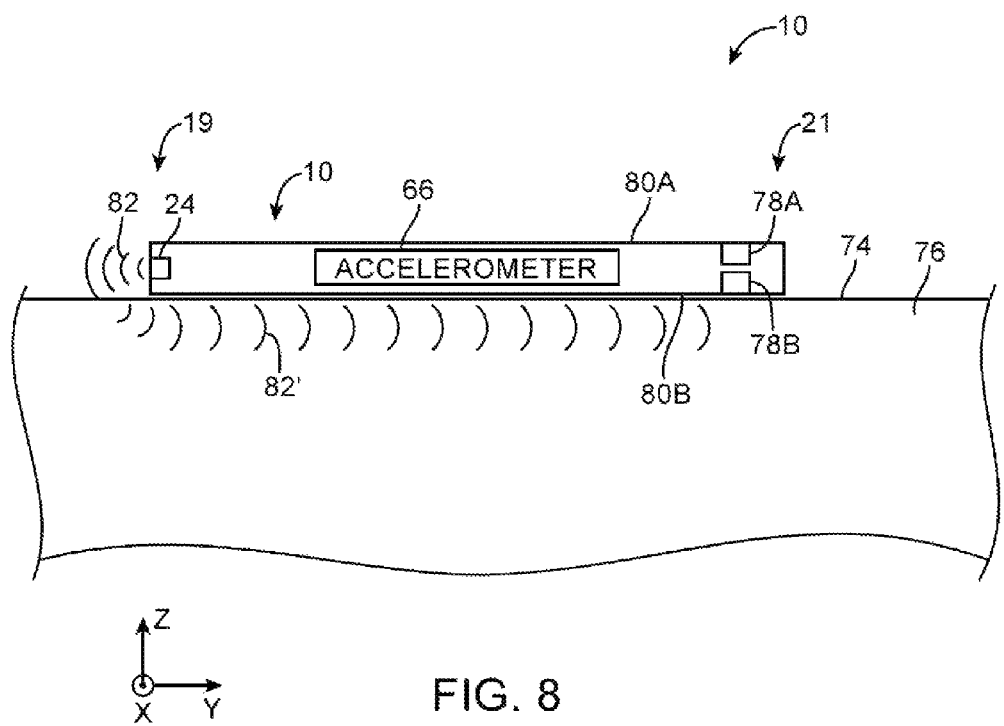
FIG. 8 is a cross-sectional side view of an illustrative electronic device being used while resting on an external structure such as a body part or while resting on an inanimate object in accordance with an embodiment of the present invention.

Consider, as an example, device 10 of FIG. 8. In this scenario, device 10 is resting on upper surface 74 of object 76. The nature of object 76 is initially unknown to device 10. Object 76 may be, for example, an inanimate object such as a table or may be a leg or other body part of a user.

As shown in FIG. 8, device 10 may have opposing surfaces 80A and 80B and opposing ends 19 and 21. One of surfaces 80A and 80B may be the front face of device 10 and the other of surfaces 80A and 80B may be the rear face of device 10. A user may place device 10 face up or face down on a surface, so the orientation of device 10 is not generally known in advance.

Microphones 78A and 78B may be located at end 21 of device 10. Microphone 78A may be located on surface 80A of device 10. Microphone 78B may be located on opposing surface 80B. One of microphones 78A and 78B may be front-facing microphone 20 and the other of microphone 78A and 78B may be rear-facing microphone 35.

An audio source such as speaker 24 at lower end 19 of device 10 may emit sound 82 when it is desired to use audio sensing techniques to help determine the nature of the object on which device 10 is resting. To avoid creating an audible distraction for the user of device 10, sound 82 is preferably out of the range of human hearing. For example, sound 82 may be an ultrasonic tone such as a tone at 30 kHz, a tone at a frequency from 20-100 kHz, a tone above 20 kHz, at tone at 20 kHz, or one or more ultrasonic tones at other ultrasonic frequencies. Lower frequency tones may also be used such as a tone at 10 kHz, etc.

The audio source that emits the ultrasonic signals may be a speaker such as speakerphone speaker 24 or ultrasonic audio signals may be emitted by other types of ultrasonic audio source (e.g., a tone generator).

Due to the presence of structure 76, some of sound (e.g., sound 82') will pass through structure 76 and can be picked up by the downward facing microphone in device 10. A significantly reduced amount of sound 82 (i.e., the sound that has been emitted outwards into the air around device 10) will reach the upward facing microphone in device 10.

Accelerometer 66 may be used to determine the orientation of device 10. In the example of FIG. 8, surface 80A of device 10 is facing upward in direction Z and surface 80B of device 10 is facing downward in direction −Z. Accelerometer 66 can measure the direction of the Earth's gravity and can use this information to determine whether microphone 78A or microphone 78B is currently the downward facing microphone. The downward facing microphone may then be used in monitoring the surroundings of device 10 for the possible presence of ultrasonic tones 82'. If ultrasonic signals 82' are received by the downward facing microphone, device 10 can conclude that device 10 is resting on a table or other inanimate object. In the presence of a softer more sound absorbing structures 76 such as user's clothing and/or body, sound 82' will be absorbed. If ultrasonic signals 82' are not detected by the downward facing microphone, device 10 may conclude that there is a possibility that device 10 is not resting on an inanimate object and might be resting on a part of the body of a user.

Figure 9:
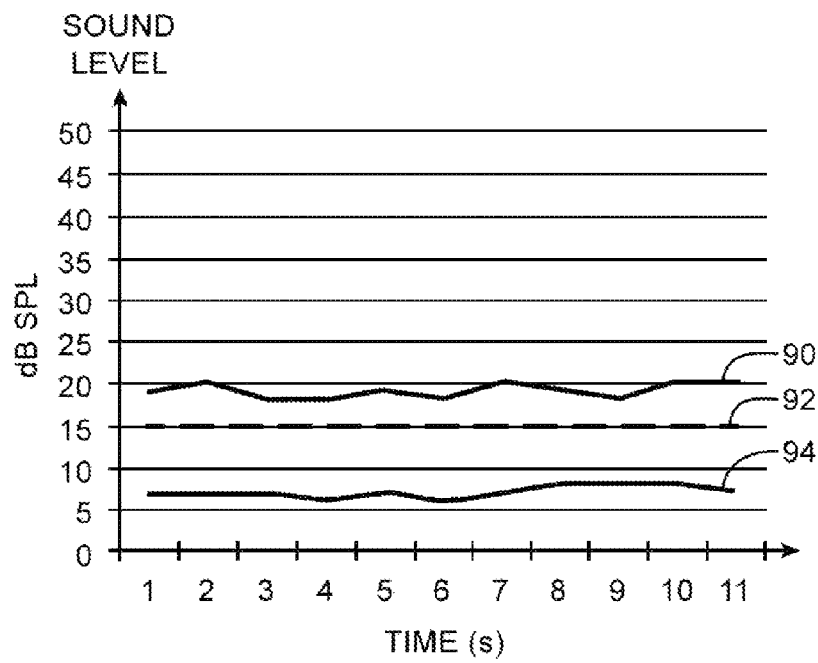
FIG. 9 is a graph showing how ultrasonic audio signals can be detected by microphones on opposing sides of an electronic device while the device is resting on a surface such as a leg or other body part in accordance with an embodiment of the present invention.
Figure 10:
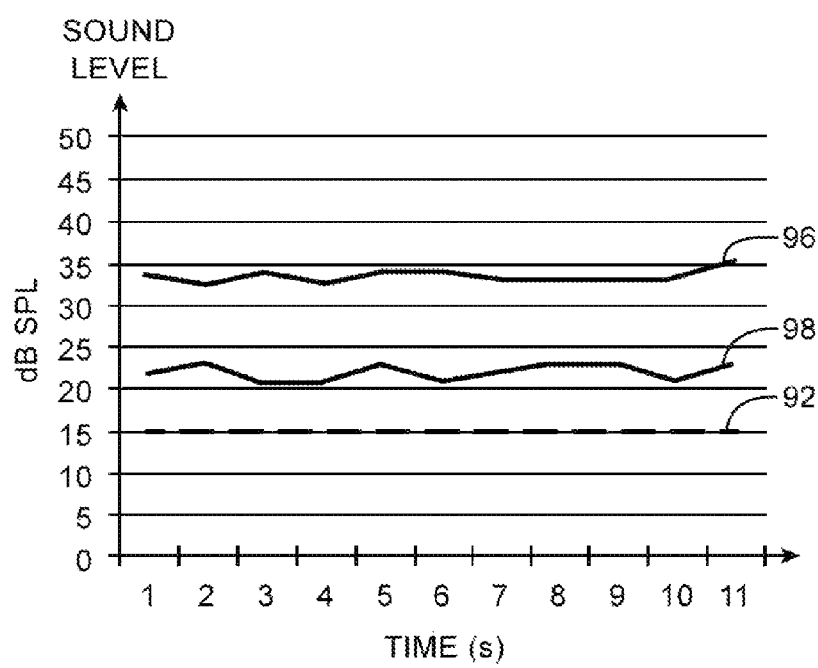
FIG. 10 is a graph showing how ultrasonic audio signals can be detected by microphones on opposing sides of an electronic device while the device is resting on a surface of an inanimate object such as a table in accordance with an embodiment of the present invention.

FIGS. 9 and 10 are graphs showing how the audio information gathered using microphones 78a and 78b while generating ultrasonic audio signals using speaker 24 can be used to determine whether device 10 is resting on an inanimate object such as a table or is potentially resting on a part of a human body. To improve the signal-to-noise ratio of the audio system formed by the microphones and speaker, the audio information that is gathered by the microphones may be filtered with a low pass filter, a bandpass filter, or other filter to remove ambient noise other than the ultrasonic signals generated using the speaker.

The graph of FIG. 9 corresponds to a configuration in which device 10 is resting on a user's leg. Dashed line 92 represents a baseline (average) level of sound that may be used as a detection threshold. Line 90 corresponds to sound from the upward facing microphone that is not blocked by the presence of the user's body. Line 94 corresponds to sound from the downward facing microphone that is resting on surface 76 and is blocked (absorbed) by surface 76 of FIG. 8.

The graph of FIG. 10 corresponds to a configuration in which device 10 is resting on a hard inanimate surface such as a table. Dashed line 92 represents the baseline sound level that is used as the detection threshold. Line 98 corresponds to sound from the upward facing microphone (i.e., the unblocked microphone). Line 96 corresponds to sound from the downward facing microphone that is resting on surface 76 and is blocked by surface 76 of FIG. 8.

As the graphs of FIGS. 9 and 10 demonstrate, the measured sound level (e.g., the amount of detected ultrasonic signal) by the unblocked (upward facing) microphone does not change appreciably between the table and body environments. The magnitude of curve 90 in FIG. 9 is comparable to the magnitude of curve 96 of FIG. 10, because this signal level corresponds to sound that is passing between the speaker and the unblocked microphone through free space, rather than being transmitted through or near the surface on which device 10 is resting. As a result, the nature of surface 76 does not have a significant impact on the amount of sound detected by the unblocked microphone. Because data from the unblocked microphone is not sensitive to the nature of the surface on which device 10 is resting, device 10 preferably ignores data from the unblocked microphone. Instead, device 10 uses accelerometer 66 to identify the blocked (downward facing) microphone and uses the blocked microphone in gathering audio data.

Curve 94 of the graph of FIG. 9 represents the audio signal measured by the blocked (downward facing) microphone when device 10 is resting on the user's body, whereas curve 96 of FIG. 10 represents the audio signal measured by the blocked (downward facing) microphone when device 10 is resting on a table. The magnitude of curve 94 of FIG. 9 is less than threshold 92, because the sound (sound 82') from speaker 24 is attenuated by the presence of the soft clothing and body tissue associated with the user's body. The magnitude of curve 96 in FIG. 10 is greater than threshold 92, because sound 82' tends to be transmitted efficiently between speaker 24 and the blocked (downward facing) microphone through the table on which device 10 is resting.

Device 10 may therefore compare the amount of sound that is received by the blocked microphone to a predetermined threshold (e.g., threshold 92) to help determine whether device 10 is resting on a table or a user's body. If the detected sound level exceeds the threshold, device 10 can conclude that device 10 is resting on a table. If the detected sound level does not excess the threshold, device 10 can conclude that device 10 is not resting on the table and may therefore be resting on a user's body.

Figure 11:
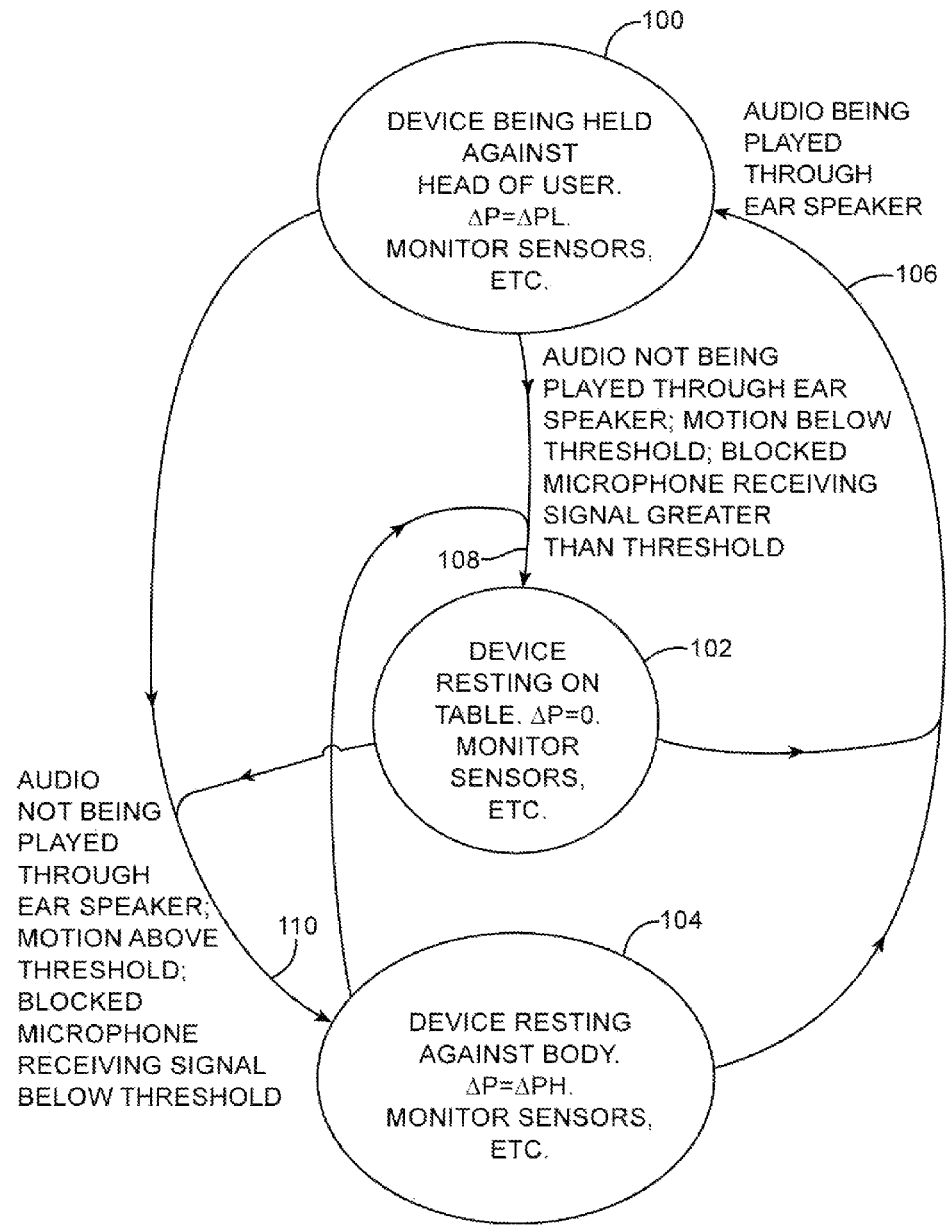
FIG. 11 is a flow chart of illustrative steps involved in operating an electronic device while regulating a maximum transmitted wireless power level in accordance with an embodiment of the present invention.

FIG. 11 is a diagram illustrating operations involved in using data from sensors and information on the operating state of device 10 in dynamically adjusting maximum transmit power levels. As shown in FIG. 11, device 10 may operate in modes 100, 102, and 104. In each of these modes, device 10 may use control circuitry 28 to analyze information about whether a user is using ear speaker 18. Device 10 may also gather information from sensors 42. For example, device 10 may gather information from accelerometer 66. Motion data from accelerometer 66 (e.g., summed X, Y, and Z channel data, summed standard deviations of the X, Y, and Z channel data, etc.) may be gathered and orientation data from accelerometer 66 may be gathered (e.g., information indicating which side of device 10 is facing upward and which side of device 10 is facing downward). Speakerphone speaker 24 may generate ultrasonic audio, which may be detected using rear microphone 35 and/or front microphone 20. The orientation data from accelerometer 66 may be used in identifying the downward facing microphone, so that signals from the upward facing microphone can be ignored.

Whenever it is determined that device 10 is playing audio through ear speaker 18, device 10 may conclude that it is likely that the user is operating device 10 in an "at ear" mode of the type described in connection with FIG. 3. During the "at ear mode" (mode 100), the maximum transmit power level may be adjusted to a level that is appropriate for use when the user is holding device 10 against the user's face. As an example, the maximum transmit power for wireless signals may be adjusted to a level that is lowered by an amount $\Delta PL$ with respect to the value of Pmax that is used in unrestricted transmit scenarios (i.e., the maximum value of Pmax in device 10). During the operations of mode 100, device 10 monitors accelerometer 66 to detect motion, compares the amount of detected motion to a predetermined motion threshold, monitors accelerometer 66 to determine the orientation of device 10, generates ultrasonic audio signals with speakerphone speaker 24, monitors the downward facing microphone (as determined by the orientation of device 10) to measure the ultrasonic audio signals, compares audio data gathered by the downward facing microphone to a predetermined ultrasonic audio signal threshold, and monitors the state of device 10 to determine whether or not audio is being played through ear speaker 18.

In response to determining that audio is not being played through ear speaker 18, device 10 can conclude that device 10 is not in the "at head" position, but rather might be resting against the body of the user or an inanimate object such as a table.

If no audio is being played through ear speaker 18 and if the amount of motion detected by the accelerometer is below the predetermined motion threshold and if the signal from the downward facing microphone is above the predetermined ultrasonic audio signal threshold, device 10 can conclude that device 10 is resting on a structures such as table 52 of FIG. 4. Device 10 can therefore transition from mode 100 to mode 102 (if operating in mode 100) or from mode 104 to mode 102 (if operating in mode 104), as indicated by line 108.

During the "on table" mode, the maximum transmit power level may be adjusted to a level that is appropriate for use when the user is operating device 10 on an inanimate object such as a table. As an example, the maximum transmit power for wireless signals may be adjusted to a level that is equal to the maximum value of Pmax in device 10.

During the operations of mode 102, device 10 monitors accelerometer 66 to detect motion, compares the amount of detected motion to a predetermined motion threshold, monitors accelerometer 66 to determine the orientation of device 10, generates ultrasonic audio signals with speakerphone speaker 24, monitors the downward facing microphone (as determined by the orientation of device 10), compares audio data gathered by the downward facing microphone to a predetermined ultrasonic audio signal threshold, and monitors the state of device 10 to determine whether or not audio is being played through ear speaker 18.

If no audio is being played through ear speaker 18 and if the amount of motion detected by the accelerometer is above the predetermined motion threshold and if the signal from the downward facing microphone is below the predetermined ultrasonic audio signal threshold, device 10 can conclude that device 10 is resting on a human body part such as the leg of the user. Device 10 can therefore transition from mode 100 to "on body" mode 104 (if operating in mode 100) or from mode 102 to mode 104 (if operating in mode 102), as indicated by line 110.

During the "on body" mode, the maximum transmit power level may be adjusted to a level that is appropriate for use when the user is operating device 10 while device 10 is resting on the user's body. As an example, the maximum transmit power for wireless signals may be adjusted to a level that is lowered by an amount ΔPH with respect to the maximum (unrestricted) value of Pmax, where ΔPH is greater than ΔPL.

During the operations of "on body" mode 104, device 10 monitors accelerometer 66 to detect motion, compares the amount of detected motion to a predetermined motion threshold, monitors accelerometer 66 to determine the orientation of device 10, generates ultrasonic audio signals with speakerphone speaker 24, monitors the downward facing microphone (as determined by the orientation of device 10), compares audio data gathered by the downward facing microphone to a predetermined ultrasonic audio signal threshold, and monitors the state of device 10 to determine whether or not audio is being played through ear speaker 18.

If, during mode 102 or 104, ear speaker 18 is switched into use, device 10 can transition to mode 100, as indicated by line 106.

In situations in which sensor data is not consistent, such as when motion data indicates that device 10 is resting on a table, but this is not corroborated by audio data from the downward facing microphone (i.e., the audio data is below the predetermined audio threshold) or such as when audio data from the downward facing microphone indicates that device 10 is resting on a table, but this is not corroborated by motion data (i.e., the motion data is above the motion threshold), the most conservative maximum transmit power level may be selected (i.e., it may be assumed, for the sake of being conservative, that device 10 is resting on the user's body). For example, device 10 may transition to mode 104 whenever there is ambiguity in the sensor data or other information about the operating state of device 10. This is one example of a way in which ambiguous sensor data may be interpreted. Other actions may be taken if desired (e.g., sensor data may be measured again, additional sensors may be consulted, a user may be prompted for input on a touch screen display or other input-output device, etc.).

If desired, additional sensor data may be analyzed by control circuitry 28 to help determine the operating mode to use for device 10. For example, control circuitry 28 can gather and analyze proximity sensor data, gyroscope data, Global Positioning System data, proximity sensor data, ambient light sensor data, touch sensor data, etc. The arrangement of FIG. 11 is merely illustrative.

The foregoing is merely illustrative of the principles of this invention and various modifications can be made by those skilled in the art without departing from the scope and spirit of the invention.

What is claimed is:

1. An electronic device, comprising:
   a microphone;
   an ear speaker;
   a radio-frequency antenna with which radio-frequency signals are transmitted with a transmit power that is capped at a maximum transmit power level; and
   circuitry that adjusts the maximum transmit power level based at least partly on data from the microphone and at least partly in response to determining that no audio is being played through the ear speaker.

2. The electronic device defined in claim 1 further comprising a sound source that emits audio signals, wherein the circuitry is configured to measure the emitted audio signals with the microphone.

3. The electronic device defined in claim 2 wherein the circuitry is configured to compare the measured emitted audio signals to a predetermined audio signal threshold.

4. The electronic device defined in claim 3 wherein the circuitry is configured to raise the maximum transmit power level at least partly in response to determining that the measured emitted audio signals are more than the predetermined audio signal threshold.

5. The electronic device defined in claim 4 further comprising an accelerometer, wherein the circuitry is configured to gather motion information with the accelerometer that is associated with motion of the electronic device.

6. The electronic device defined in claim 5 wherein the circuitry is configured to compare the gathered motion information to a predetermined motion threshold.

7. The electronic device defined in claim 6 wherein the circuitry is configured to raise the maximum transmit power at least partly in response to determining that the gathered motion information is less than the predetermined motion threshold.

8. The electronic device defined in claim 7 wherein the electronic device has opposing front and rear sides with, respectively, a front facing microphone and a rear facing microphone and wherein the microphone with which the circuitry measures the audio signals is a selected one of the front facing microphone and the rear facing microphone.

9. The electronic device defined in claim 8 wherein the circuitry is configured to gather orientation data from the accelerometer and is configured to select the microphone with which to measure the audio signals from the front and rear facing microphones based on the gathered orientation data.

10. The electronic device defined in claim 9 wherein the audio source comprises a speakerphone speaker.

11. The electronic device defined in claim 10 further comprising a housing having opposing upper and lower ends, wherein the front-facing microphone and rear-facing microphone are located at the upper end and wherein the speakerphone speaker is located at the lower end.

12. A method of adjusting a maximum wireless signal transmit power level in a portable electronic device that caps maximum wireless signal transmit power from a wireless transmitter in the portable electronic device, comprising:
    measuring audio signals with the portable electronic device;
    measuring motion signals with the portable electronic device, wherein the measured motion signals include orientation data that reflects how the portable electronic device is oriented;
    selecting which of multiple microphones to use in the portable electronic device to measure the audio signals based on the orientation data; and
    at least partly in response to the measured audio signals and the measured motion signals, adjusting the maximum wireless signal transmit power level with the portable electronic device.

13. The method defined in claim 12 wherein the orientation data reflects how the portable electronic device is oriented with respect to the Earth.

14. The method defined in claim 13 further comprising transmitting ultrasonic sound with a speakerphone speaker in the electronic device, wherein measuring the audio signals comprises measuring the transmitted ultrasonic sound with a microphone in the electronic device that has been selected based on the orientation data.

15. The method defined in claim 14 wherein the microphone selected based on the orientation data is a downward facing microphone, the method further comprising:
   determining whether sound is being played through an ear speaker in the electronic device; and
   adjusting the maximum wireless signal transmit power based at least partly on whether sound is being played through the ear speaker.

16. The method defined in claim 15 wherein the multiple microphones comprise a front facing microphone and a rear facing microphone located on opposing sides of the portable electronic device and wherein measuring the transmitted ultrasonic sound with the microphone selected based on the orientation data comprises measuring the transmitted ultrasonic sound with a selected one of the front facing microphone and the rear facing microphone.

17. An electronic device, comprising:
   a microphone that is configured to measure ultrasonic sound transmitted through a surface on which the electronic device is located;
   a radio-frequency antenna with which radio-frequency signals are transmitted with a transmit power that is capped at a maximum transmit power level; and
   circuitry that adjusts the maximum transmit power level based at least partly on data from the microphone, wherein the circuitry is configured to set the maximum transmit power level to a first level in response to determining that the microphone is gathering a first amount of the ultrasonic sound transmitted through the surface and the circuitry is configured to set the maximum transmit power level to a second level that is greater than the first level in response to determining that the microphone is gathering a second amount of the ultrasonic sound transmitted through the surface that is greater than the first amount of the ultrasonic sound transmitted through the surface.

18. The electronic device defined in claim 17 further comprising an accelerometer, wherein the circuitry is configured to gather orientation information from the accelerometer that indicates how the electronic device is oriented.

19. The electronic device defined in claim 18 further comprising:
   an ear speaker, wherein the circuitry is configured to set the maximum transmit power level to a third level in response to determining that sound is playing through the ear speaker regardless of the amount of ultrasonic sound transmitted through the surface that is being gathered by the microphone, wherein the third level is greater than the first level and less than the second level.

* * * * *